Feb. 12, 1963  F. D. RUGG  3,077,357
FIFTH-WHEEL ASSEMBLY
Filed April 13, 1960  4 Sheets-Sheet 1

INVENTOR
FREDERICK D. RUGG
BY Cushman, Darby & Cushman
ATTORNEYS

INVENTOR
FREDERICK D. RUGG
BY Cushman, Darby & Cushman
ATTORNEY

INVENTOR
FREDERICK D. RUGG

Feb. 12, 1963  F. D. RUGG  3,077,357
FIFTH-WHEEL ASSEMBLY
Filed April 13, 1960  4 Sheets-Sheet 4

INVENTOR
FREDERICK D. RUGG

BY Cushman, Darby & Cushman
ATTORNEY 3,077,357
FIFTH-WHEEL ASSEMBLY
Frederick D. Rugg, East Bridgewater, Mass., assignor to Inertia-Matic, Inc., Watertown, Mass., a corporation of Massachusetts
Filed Apr. 13, 1960, Ser. No. 22,064
10 Claims. (Cl. 280—438)

This invention relates to freight-carrying vehicles, and particularly to the type of vehicle incorporating a fifth-wheel assembly for coupling the load-carrying section of the vehicle with the power or drive section. The invention finds particular utility when used with tractor-trailer units of the type now commonly employed to haul freight over the highways.

Tractor-trailer units employ fifth-wheel assemblies for coupling the trailer section with the tractor section so that the trailer section is pivotally movable with respect to the tractor section. In order to provide for some minor movements of the portions of the fifth-wheel assembly during coupling of the tractor with the trailer, and in order to reduce the shock and vibration transferred between separate sections of the tractor-trailer combination, various types of means have heretofore been suggested for use in coupling the fifth-wheel assembly to the tractor, and/or to the trailer. The prior art structures have not been effective in eliminating the drag of the trailer on the tractor. More particularly, in prior art tractor-trailer combinations, the trailer has exerted certain forces on the tractor which tend to slow the tractor down, with resultant utilization of excess fuel, and which otherwise decrease the over-all efficiency of the unit.

The present invention is directed to overcoming, or counter-acting, the above-described forces exerted by the trailer in such a manner as to materially increase the over-all efficiency of tractor-trailer units. Accordingly, a primary object of the present invention is to provide in combination (1) a tractor section; (2) a trailer section; (3) a fifth-wheel assembly coupling the tractor section with the trailer section; and (4) devices for mounting the fifth-wheel assembly whereby such assembly is universally movable with respect to one of the sections and thus adapted to counter-act the forces exerted by the trailer on the tractor during operation of the combination.

By providing a combination as set forth in the preceding paragraph, wherein the fifth-wheel assembly is mounted for universal movement, the roll and sway of the trailer during ordinary operation is reduced, the dynamic increased loading ordinarily caused by abrupt changes in direction is reduced, the road-shock is substantially reduced resulting in a reduction in friction, heating and pressure build-up within the fifth-wheel coupling, racking is substantially eliminated, strain on the motor and the clutch of the power portion of the vehicle are effectively eliminated thereby reducing the required starting torque, and a safer over-all tractor-trailer vehicle is provided.

A further object of the present invention is to provide a tractor-trailer combination incorporating devices for mounting the fifth-wheel assembly for universal movement with respect to one of the sections whereby the advantages set for hereinabove are obtained, and wherein the devices providing for such universal movement can be easily installed on existent tractor-trailer combinations.

In accordance with the preceding objects, the present invention provides in a vehicle the combination of (a) a load-carrying trailer having a frame; (b) a tractor adapted to power the trailer and also having a frame; (c) a fifth-wheel means for coupling the tractor with the trailer; and (d) a plurality of universal coupling units, each of the coupling units comprising a pair of bearing members having opposed curved complementary bearing surfaces, a ball member disposed between the bearing surfaces and movable thereover, first bracket means coupling one of the bearing members with one of the frames, second bracket means coupling the other of the bearing members with the fifth-wheel means whereby the fifth-wheel means is universal movable with respect to one of the frames, and means for limiting relative movement between the bearing members. Universal coupling units of the type which are particularly adapted for use in accordance with the present invention are shown in the following U.S. patents: No. 2,867,472 issued Jan. 6, 1959 to W. D. Harper; No. 2,355,528 issued Aug. 8, 1944 to W. D. Harper; No. 1,695,373 issued Dec. 18, 1928 to W. D. Harper.

In the preferred embodiments of the invention, the universal coupling units incorporated in the combination include, in addition to the bearing members, the ball member and the bracket means, hollow cups which surround the bearing members. One of the cups is larger than the other, whereby the skirt of the larger cup fits over the skirt of the smaller cup. The cups symmetrically enclose the bearing members so that when the cups are aligned, the bearing members are aligned.

Accordingly, a further primary object of the present invention is to provide a centering device which cooperates with the skirts of the cups so as to allow for easily positioning the bearing members in proper opposed relation when securing the coupling unit between a frame and the fifth-wheel means. Specifically, a further object of the present invention is to provide a ring member which cooperates with the skirt portions of the cups surrounding the bearing members to align the skirts automatically, and thereby align the opposed bearing members.

In this connection, the present invention provides an open-center saddle having a top surface, a bottom surface, and inner and outer faces extending between the top and bottom surfaces. A recess extends from the bottom surface toward the top surface, and has a configuration and size to snugly receive the skirt of the smaller of the cups. The outer face of the saddle is continuously and smoothly sloped outwardly from the top surface of the saddle to the bottom surface thereof, such that the area defined by the bottom of the outer surface of the saddle is greater than the area defined by the inside of the skirt of the larger cup, and the area defined by the top of the outer surface of the saddle is less than the area defined by the inside of the skirt of the larger of the cups, whereby when the saddle is disposed on the smaller of the cups with the recess snugly receiving the skirt of the smaller of the cups, and the larger of the cups is disposed thereabove, the larger of the cups will automatically center above the smaller of the cups so that the opposed bearing surfaces which the cups symmetrically encase are aligned.

From the foregoing objects it should be apparent that the present invention is directed (1) to providing an improved tractor-trailer combination having universal coupling units for mounting the fifth wheel assembly of the combination; and (2) to providing means for easily installing the universal coupling units on a tractor-trailer combination.

The invention will be better understood, and objects other than those specifically set forth above will become apparent, when consideration is given to the following detailed description of the invention. The description refers to the annexed drawings wherein.

Figure 7:
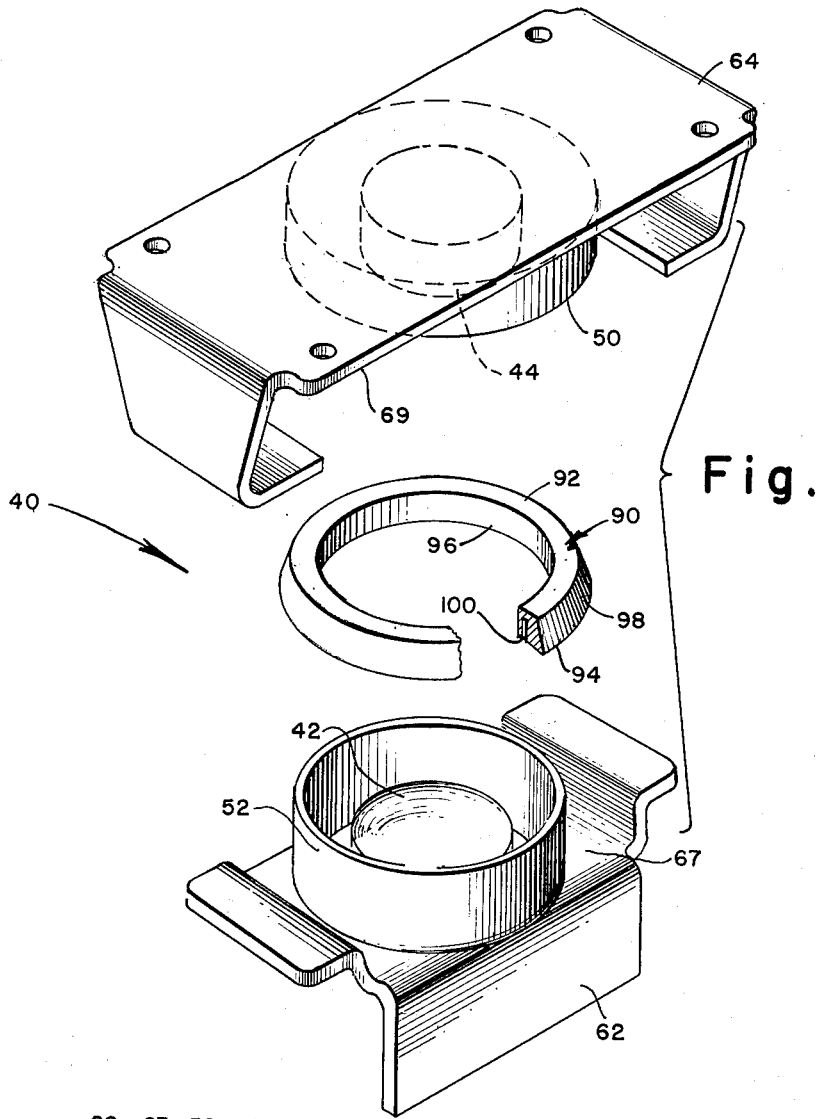
Figure 8:
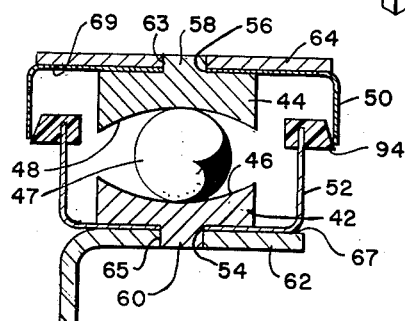

FIGURE 7 is an exploded view of the preferred form of universal coupling unit used in accordance with the teachings of this invention, FIGURE 7 showing in detail the centering device provided by this invention for properly aligning opposed portions of the universal coupling unit; and FIGURE 8 is a cross-sectional view of the universal coupling unit shown in FIGURE 7, FIGURE 8 showing the centering device provided by this invention disposed in operative position.

Figure 1:
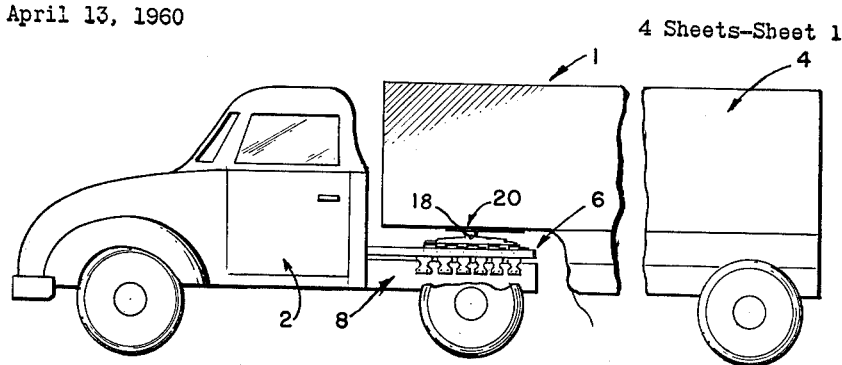
FIGURE 1 is a side view of a tractor-trailer unit provided with a fifth-wheel assembly, which assembly is coupled to the frame of the tractor in accordance with the teachings of this invention.

Referring now more particularly to the drawings, in FIGURE 1 the numeral 1 has been used to generally designate a tractor-trailer combination comprising a tractor 2, a trailer 4, and a fifth-wheel assembly 6 coupling the trailer 4 with the tractor 2. The particular design of the tractor 2 and associated trailer 4 form no part of the present invention. However, it should be understood that the tractor and trailer both have frame structures between which the fifth-wheel assembly 6 is coupled. More particularly, the tractor 2 has a longitudinally-extending frame generally designated by the numeral 8, and the trailer 4 has a frame structure generally designated by the numeral 20. The fifth-wheel assembly is coupled between the frame structure 8 and the frame structure 20 so that the trailer is horizontally, and vertically, pivotal with respect to the tractor 2. Fifth-wheel assemblies which provide for such pivotal movement between a tractor and associated trailer are well-known in the art. As will become apparent from the following discussion, any of the well-known fifth-wheel assemblies can be used in accordance with the invention.

Notwithstanding the fact that this specification refers to tractor-trailer combinations, and couplings with a fifth-wheel assembly between a tractor section and a trailer section, it should be understood that the invention can be applied to coupling assemblies between associated trailer sections where a vehicle comprises more than one trailer section without departing from the scope and spirit of the invention.

Figure 2:
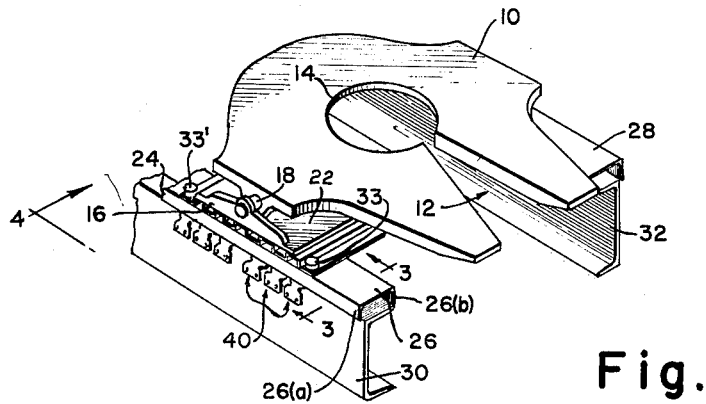
FIGURE 2 is a perspective view of the portion of the fifth-wheel assembly which is carried by the tractor unit as shown in FIGURE 1, FIGURE 2 presenting in more detail the preferred manner in which the universal coupling units are secured between the fifth-wheel assembly and the frame of the tractor.

For illustrative purposes, and in order to facilitate understanding of the invention, a fifth-wheel assembly of the type having a pivotal fifth-wheel plate adapted to receive a kingpin is presented in the drawings. FIGURE 2 presents in detail one type of fifth-wheel plate which may be utilized, and the manner in which such fifth-wheel plate is coupled to the tractor frame.

By referring to FIGURE 2, it will be noted that the fifth-wheel plate 10 is provided with a channel 12 extending into a kingpin-receiving opening 14. The latching structure, and similar devices associated with connecting the kingpin securely with the kingpin plate, have been eliminated. Such devices form no part of the present invention, and their elimination simplifies over-all consideration of the invention.

The fifth-wheel assembly plate 10 is pivotally supported above the tractor frame 8. As shown in FIGURE 2, the plate 10 has a pivot shaft such as that designated by numeral 18 projecting from either side thereof. The pivot shafts cooperate with bearing blocks such as that designated by the numeral 16 which are supported on bearing-block plate 22. The bearing-block plate 22 is disposed above, and secured to, a corrugated reinforcing sheet 24 which is attached to the channels 26 and 28 extending parallel to and above the channels 30 and 32 which make up the frame 8 of the tractor 2.

As is apparent from FIGURE 2, the channels 26 and 28 preferably comprise U-beams which have the open side thereof facing downwardly, and the channels 30 and 32 comprise U-beams which have the open side thereof facing inwardly. The bearing-block plate 22 can be welded to the corrugated sheet 24 or otherwise suitably attached thereto, and similarly the corrugated sheet 24 can be welded to the beams 26 and 28, or otherwise suitably attached thereto by bolts such as those designated by numerals 33, 33'. Coupled between the channels or beams 26 and 28, and the channels or beams 30 and 32, are the universal coupling units 40.

The channel or beam construction of the tractor frame presented in FIGURE 2 is common on existing tractor-trailer units in use today. However, it is to be understood that other types of frames may be employed according to the invention. The important feature is that a frame is existent to which the universal coupling units 40 can be secured.

The universal coupling units 40, and the component parts thereof, will be best understood by reference to FIGURES 7 and 8. Each of the units 40 comprises a pair of opposed bearing members 42 and 44 having opposed curved complementary bearing surfaces 46 and 48 as shown in FIGURE 8. Surrounding each of the bearing members is a hollow cup which symmetrically encases the bearing member. More particularly, the cup 52 has a skirt 53 symmetrically surrounding the lower bearing member 42, and the cup 50 has a skirt 51 symmetrically surrounding the upper bearing member 44. As is apparent from FIGURE 8, the cup 50 is larger than the cup 52 so that the skirt 51 of cup 50 fits over and around the skirt 53 of the cup 52. Since the cups are symmetrically disposed with respect to the bearing members, when the cups are aligned the bearing members are aligned. Preferably, the cups 50 and 52 are provided with apertures such as those designated by numerals 54 and 56 centrally disposed in the base portion thereof, the bracket members 62 and 64 are provided with corresponding apertures 63 and 65 in the seat faces 67 and 69 thereof, and the bearing members carry bosses 58 and 60 extending from the base portions thereof. When the bosses 58 and 60 pass through apertures 54 and 56 the bearing members are centered in the cups, and similarly, when the bosses pass through the apertures 63 and 65 on the brackets, the cups and bearing members are properly positioned on the seat faces of the brackets. Moreover, such bosses are dimensioned so as to allow for driving the bearing members into frictional engagement with the associated cups and bracket members 62 and 64.

Although the construction of the cups, bearing members and associated brackets has been briefly described hereinabove, for a more complete understanding of the exact constructions which preferably are used in accordance with the teachings of this invention, reference should be had to U.S. Patent No. 2,355,528 issued to Harper on Aug. 8, 1944, and U.S. Patent No. 2,867,472 issued to Harper on Jan. 6, 1959.

Figure 5:
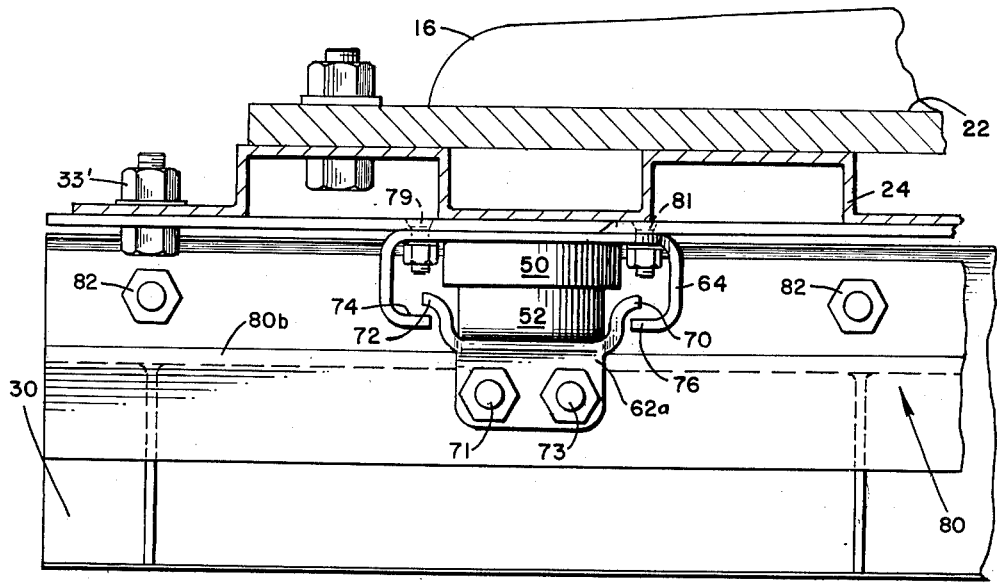
FIGURE 5 is a fragmentary side elevation similar to FIGURE 3 showing a modified form of support for the universal coupling unit.

As is apparent from FIGURES 7 and 8, the universal coupling units are provided with first bracket means 62 for coupling the bearing member 42 with a frame or the like, and second bracket means 64 for coupling bearing member 44 with another frame means. More specifically, as shown in FIGURE 5, the bracket means 62a is coupled to a support member by bolts such as those designated by numerals 71 and 73. Similarly, the bracket 64 is coupled to the channel 30 by means of bolts such as those designated by numerals 79 and 81. Of course, although only one universal coupling unit is shown in FIGURE 5, it will be understood that a plurality of such units are provided between the support member and the channel 30 on one side of the fifth-wheel assembly, and another plurality of universal coupling units are provided between identical support member and the channel 32 on the opposite side of the fifth-wheel assembly. (FIGURES 1 and 2.) Thus there are two spaced groups of universal coupling units disposed longitudinally of the frame of the tractor, and as shown on opposite sides of the fifth-wheel supporting assembly.

Figure 3:
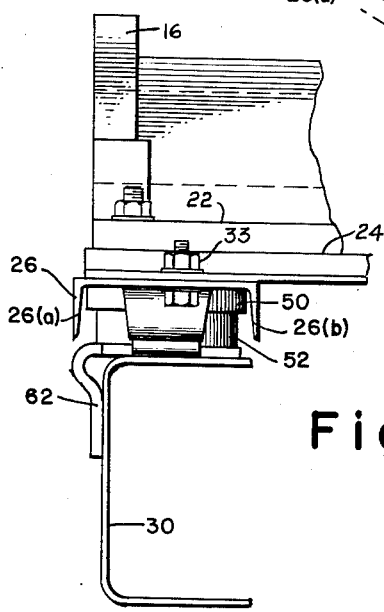
FIGURE 3 is a fragmental end view taken on the line 3—3 of FIGURE 2 and presenting in more detail the preferred manner in which the universal coupling units are secured between the tractor frame and the fifth-wheel assembly.
Figure 4:
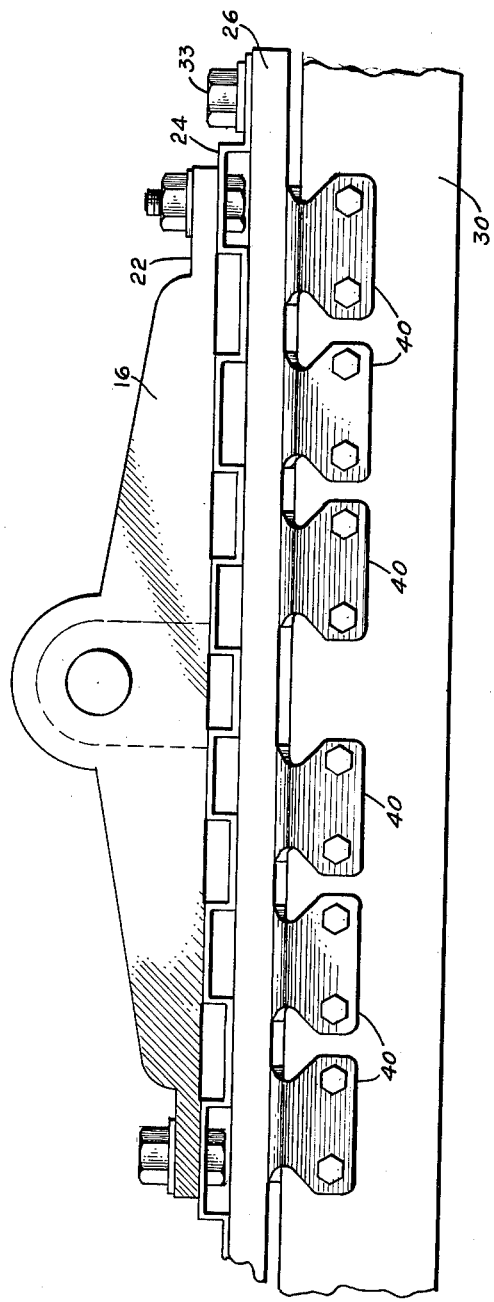
FIGURE 4 is a side elevation of the fifth-wheel assembly secured to one of the vehicle frame rails.

Preferably, the channels 26 and 28 have a space between opposed legs 26(a) and 26(b) thereof substantially equal to the outer diameter of the cup 50 as shown in FIGURE 3. Legs 26(a) and 26(b) of channel 26 depend on either side of the cup 50 so that that cup may be easily positioned centrally of the channel 26.

By again referring to FIGURE 5, it will be noted that the bracket means 62a and 64 are provided with cooperating flanges. Flanges 70 and 72 extend from either side of the seat face 67 of the bracket 62 and cooperate with flanges 74 and 76 extending inwardly and above the seat face 69 of bracket 64. Such flanges are slightly spaced apart so as to allow for movement between the respective bracket means, both horizontally and vertically, whereby when the ball member moves across the bearing faces there will be some play between the bracket means. At the same time, the flanges serve as a means for limiting movement between the respective bearing members so that the universal coupling units will not become separated. The manner in which the flanges are formed, and their particular cooperation, is set forth in detail in the Harper patents referred to hereinabove. Accordingly, it is sufficient for purposes of this specification, to understand that the bracket means carry as an integral part thereof flanges which serve as means for limiting movement between the bearing members carried by the respective bracket means.

FIGURES 1, 2, 3 and 4 present the preferred universal coupling units and the preferred manner of securing such units between a tractor frame and a fifth-wheel assembly when the vertical spacing between tractor and trailer is such as to allow for the units to be secured as shown. However, in some instances it is necessary to minimize the distance between the tractor and trailer at the fifth-wheel coupling. In such instances, the construction shown in FIGURES 5 and 6 is to be used.

Figure 6:
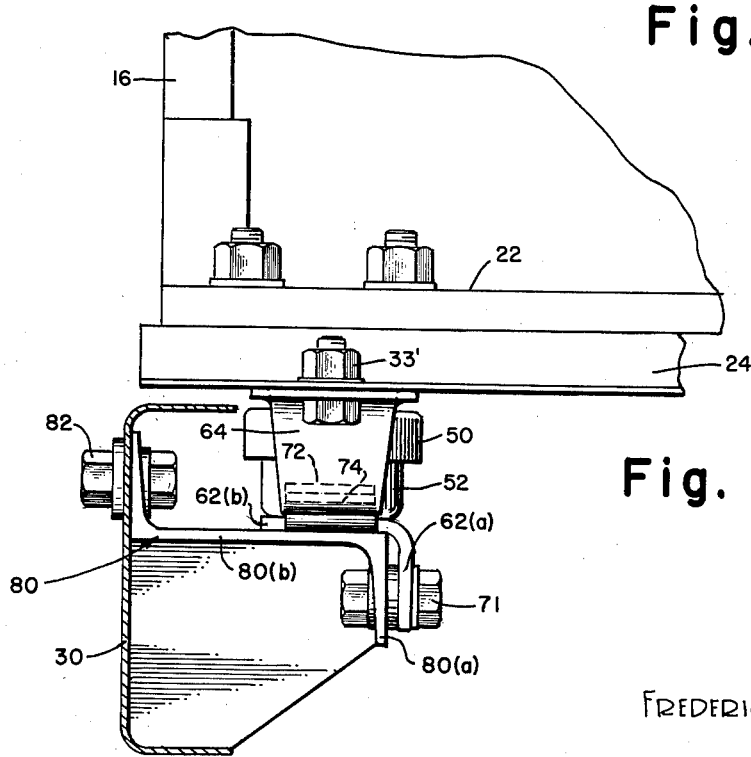
FIGURE 6 is a fragmentary end view of the modified construction shown in FIGURE 5.

In the FIGURE 6 construction, an addition Z-member 80 is provided to cooperate with each of the channels of frame 8. The attachment of the Z-member is the same with each channel and thus only one channel and associated Z-member is shown in FIGURE 6. The Z-member is coupled by means of bolts 82 with the channel 30, and serves to support the bracket 62 and thereby the universal coupling unit, inwardly of, and downwardly of, the top of the channel member. The bracket 62 is so disposed that the coupling flange 62(a) thereof is secured to the depending arm 80(a) of the Z-member by bolts such as 71, and the seat portion 62(b) thereof is resting on the lateral cross-arm 80(b) of the Z-member. With this construction, the vertical elevation of the fifth-wheel assembly need not be altered in order to provide the universal coupling units between the frame of the tractor and the fifth-wheel assembly. As should be apparent, the construction of FIGURE 6 is basically the same as the construction of FIGURE 3, and two groups of universal coupling units would be provided adjacent each channel 30 and 32 and secured thereto by a Z-member or bracket 80.

The foregoing discussion presents the manner in which the universal coupling units are coupled between the frame of the tractor and the fifth-wheel assembly according to the preferred embodiments of the invention. Although the constructions presented hereinabove are preferred, it will be realized by those of ordinary skill in the art that particular modifications of the frames, or the attaching flanges of the brackets, may be necessary to adapt the universal coupling units for use with frames and/or fifth-wheel assemblies of particular shapes. The provision of a bearing-block plate such as that designated by numeral 22 in FIGURE 2, and the provision of a corrugated sheet such as that designated by numeral 24 in FIGURE 2, serve to provide a convenient means for supporting the channels 26 and 28 in spaced relation. Moreover, such construction provides adequate support for the bearing-blocks on either side of the fifth-wheel assembly. Notwithstanding such factors, however, the mounting structure may be somewhat different without departing from the scope and spirit of the invention.

Regardless of the particular means used for supporting the fifth-wheel assembly, when the universal coupling units are provided between the fifth-wheel assembly and the tractor frame, the fifth-wheel assembly is universally movable with respect to the tractor frame. Such universal movement is achieved by virtue of the fact that each of the universal coupling units allows for universal movement between the separate bracket portions thereof.

By again referring to FIGURE 8, it will be noted that the bearing surfaces 46 and 48 between which the ball member 47 is disposed, are supported by separate brackets which are movable with respect to one another. Since the bearing members have spherical bearing surfaces 46 and 48 over which the ball member may move, the movement of one bracket with respect to the other may take place in all directions. Since the separate bracket portions 62 and 64 of the units are coupled between the tractor frame and the fifth-wheel assembly, there is universal movement of the fifth-wheel assembly with respect to the tractor frame.

To properly support the fifth-wheel assembly with respect to the tractor frame, it is necessary to provide a plurality of universal coupling units. Preferably, two spaced groups of universal coupling units are provided as shown in FIGURE 2. The number of units used in each group will depend on the size of the fifth-wheel assembly and the capacity of the trailer. Under any circumstances, however, it is necessary to secure the units in position in such a manner that when there is no load on the fifth-wheel assembly each pair of bearing surfaces is aligned with the ball member disposed in the center thereof.

To achieve such alignment or centering, during installation of the universal coupling units between the fifth-wheel assembly and the frame to which it is attached, a centering device 90 is provided. The centering device 90 comprises a ring or saddle having a top surface 92, a bottom surface 94, an inner face 96, and an outer face 98. A recess 100 extends from the bottom face 94 toward the top surface 92 between the inner face 96 and the outer face 98 of the ring or saddle. The diameter and size of the recess 100 conforms with the diameter and size of the skirt of the cup 52, whereby the recess is adapted to snugly receive the skirt 53 of cup 52 as shown in FIGURE 8. The outer face of the ring member 90 is sloped gradually and continuously outward from the top surface 92 toward the bottom surface 94. The area defined by the bottom of the outer face, or the diameter of the outer face, is larger than the area defined by the inside of the skirt portion of cup 50, or the diameter of the skirt portion of the cup 50. However, the top of the outer face 98 has a diameter smaller than the diameter of the inside of the skirt of cup 50, or to phrase this another way, defines an area smaller than the area defined by the inside of the skirt of the larger cup 50.

With such construction, when the centering device 90 is disposed on the skirt portion of the cup 52 with the recess 100 snugly receiving such skirt portion, and the cup 50 is disposed thereabove, the cup 50 automatically centers over the cup 52. Preferably, the outer face of the ring member is frustro-conical and sloped at an angle of 45°.

According to the invention, the universal coupling units are assembled with the centering rings engaged by the skirt of cups 52, and the bracket means 62 is secured to the frame of the tractor. Then, the fifth-wheel assembly channels 26 and 28 are disposed above the universal coupling units and secured thereto by bolts cooperating with the channels 26 and 28 and the brackets 64. The opposed bearing members, or more particularly the opposed surfaces 46 and 48 thereof, are maintained in alignment during all of the attaching operations. Once the attaching operations have been completed, the centering devices are struck with a hammer, or impact is otherwise applied thereto, so as to break the centering devices. Of course, if the centering devices are not broken, the first time the vehicle stops such devices will be broken by movement of the ball members 47 over the bearing surfaces 46 and 48 and into contact therewith.

The centering device 90 must be brittle so that it can be easily or relatively easily broken by impact, thus, the centering device is preferably made of a suitable plastic such as polystyrene.

As pointed out hereinabove, when a tractor-trailer combination is constructed in accordance with the above discussion, whereby the fifth-wheel assembly is supported by means of universal coupling units such as those designated by numeral 40, then the fifth-wheel assembly is universally movable with respect to the frame to which it is attached. The fifth-wheel assembly can move horizontally, laterally, and vertically under the forces of the trailer acting thereon. The provision of such mounting means greatly enhances the operating characteristics of the tractor-trailer combination with which such units are used. The improved characteristics obtained with a tractor-trailer constructed in accordance with this invention will be apparent from a review of Table I below.

*Table I*

| Items | Resultant Savings [1] |
|---|---|
| 1. Built-in safety device for driver and motoring public and equipment: | |
| (a) In emergency stopping force goes into vertical plane protecting driver, cargo and equipment | C E G. |
| (b) Reduces possibility of jack-knife of tractor-trailer combination | C E F G. |
| 2. Ease of acceleration: By moving tractor first—then load | A B D G. |
| 3. Ease of deceleration: By changing rate of deceleration between trailer and tractor | B C F G. |
| 4. Greater controllability: In steering and cornering trailer leans into the plane of acceleration giving driver much greater control | B C E. |
| 5. Braking: Improved braking results in stopping within a shorter distance | B C F. |
| 6. Vibration, impact and road shock: Substantially reduced by creation of flexible joint between load and tractor | B C E G. |
| 7. Liquid Surge: Surge effects, common to tank operations, reduced by changing longitudinal force to vertical | B C E F. |
| 8. Full engine power on grades: Given loads on given grades have shown minimum gear requirement to be one full gear higher than normal | A C D. |

[1] A—Less fuel consumption; B—Less tire wear; C—Greater driver safety and comfort; D—Less engine and drive-line assembly strain; E—Longer chassis and trailer life; F—Longer brake life; G—Protection of cargo.

In addition to the foregoing, tests were conducted under the most strenuous conditions and revealed that the safety factor resulting from the use of this invention could be analyzed upon the basis of improved results from tensile tests, compression tests, transverse shear tests, and longitudinal shear tests.

The composition of the metal which forms the complementary bearing surfaces 46 and 48 did not indicate any type of failure until pressure in excess of 110,000 p.s.i. was exerted on the bearing surfaces.

It is to be understood that the form of the invention herewith shown and described is to be taken as the preferred embodiment of the same, and that various changes may be made without departing from the spirit of the invention or the scope of the appended claims.

After reading the foregoing description of the invention, it should be apparent that the objects set forth at the outset of this specification have been successfully achieved. Accordingly, what is claimed is:

1. In a vehicle, the combination of a load-carrying trailer having a frame structure; a tractor adapted to power said trailer and having a frame structure; a fifth-wheel means for coupling said tractor with said trailer; and a plurality of universal coupling units, each of said units comprising a pair of bearing cups having opposed curved complementary bearing surfaces, a ball member disposed between said bearing surfaces and movable thereover, first bracket means coupling one of said bearing cups with one of said frame structures, second bracket means coupling the other of said bearing cups with said fifth-wheel means whereby said fifth-wheel means is universally moveable with respect to said one frame structure, and means for limiting relative movement between said cups.

2. For use with a load-carrying trailer having a first fifth-wheel coupling means secured thereto, the combination of a tractor having a frame structure, and a second fifth-wheel coupled means carried thereon for cooperation with said first fifth-wheel coupling means to attach the trailer to said tractor; and a plurality of universal coupling units disposed between said frame structure and said second fifth-wheel coupling means whereby said second fifth-wheel coupling means is universally movable with respect to said frame structure, each of said univeral coupling units comprising a pair of bearing cups having opposed curved complementary bearing surfaces, a ball member disposed between said bearing surfaces and movable thereover, first bracket means coupling one of said bearing cups with said frame structure, second bracket means coupling the other of said bearing cups with said second fifth-wheel coupling means, and means for limiting relative movement between said cups.

3. The combination of a vehicle tractor adapted to power a load-carrying trailer, said vehicle tractor having a frame structure extending longitudinally thereof; a pivotally supported fifth-wheel plate assembly adapted to be mounted on said frame structure for cooperation with an associated coupling carried by a trailer; and a plurality of universal coupling units secured between said frame structure and said fifth-wheel plate assembly whereby said assembly is universally movable with respect to said frame structure, each of said universal coupling units comprising a pair of bearing cups having opposed curved complementary bearing surfaces, a ball member disposed between said bearing surfaces and movable thereover, first bracket means coupling one of said bearing cups with said frame structure, second bracket means coupling the other of said bearing cups with said second fifth-wheel coupling means, and means for limiting relative movement between said cups.

4. The combination defined in claim 3 wherein each of said coupling units comprises a pair of bearing cups having opposed curved complementary bearing surfaces, a ball member disposed between said bearing surfaces and movable thereon, first bracket means coupling one of said bearing cups with said frame structure, and second bracket means coupling the other of said bearing cups with said fifth-wheel assembly, said bracket means including as an integral part thereof means for limiting movement between said bearing cups.

5. The combination defined in claim 4 wherein said frame structure comprises a pair of spaced channeled beams; wherein said fifth-wheel plate assembly includes a pair of spaced channeled beams, and wherein said first bracket means are secured to said pair of beams comprising said vehicle frame, and said second bracket means are secured to said pair of beams forming part of said fifth-wheel assembly.

6. The combination defined in claim 3 wherein said universal coupling units are disposed in two aligned, spaced groups, extending longitudinally of said vehicle frame structure.

7. A centering device for use with a universal coupling unit including a pair of bearing members having opposed curved complementary bearing faces with a ball member disposed therebetween, and a pair of opposed hollow cups having skirts symmetrically surrounding said bearing members, one of said cups being smaller than the other whereby the skirt of said one cup fits over the skirt of the other of said cups; said centering device comprising an open center saddle having a top surface, a bottom surface, and inner and outer faces extending between said top and bottom surfaces, said saddle being provided with a recess extending from said bottom surface toward said top surface, said recess having a configuration and size to snugly receive the skirt of the smaller of said cups, the outer face of said saddle being continuously and smoothly sloped outwardly from the top surface of said saddle to the bottom surface of said saddle, the area defined by the bottom of said outer surface being greater than the area defined by the inside of the skirt of the larger of said cups, and the area defined by the top of said outer surface being less than the area defined by the inside of the skirt of the larger of said cups whereby when said saddle is disposed on the smaller of said cups with said recess in said saddle snugly engaging the skirt of the smaller of said cups, and the larger of said cups is disposed thereabove, the larger of said cups will automatically center above the smaller of said cups so that said opposed bearing members are aligned.

8. A centering device as defined in claim 7 wherein said saddle is adapted to be fractured upon impact.

9. A centering device for use with a universal coupling unit including a pair of bearing members having opposed curved complementary bearing faces with a ball member disposed therebetween, and a pair of opposed hollow cups having cylindrical skirts surrounding said bearing members, one of said cups being smaller than the other whereby the skirt of said one cup fits over the skirt of the other of said cups; said centering device comprising a ring having a top surface, a bottom surface, and inner and outer faces extending between said top and bottom surfaces, said ring being provided with a recess extending from said bottom surface toward said top surface, said recess having a mean diameter and width such that said recess snugly receives the skirt of the smaller of said cups, the outer face of said ring being frusto-conical with the diameter of the bottom of said outer face being greater than the inside diameter of the skirt of the larger of said cups, and the diameter of the top of said outer surface being less than the diameter of the inside of the skirt of the larger of said cups whereby when said ring is disposed on the smaller of said cups with said recess in said ring snugly engaging the skirt of the smaller of said cups, and the larger of said cups is disposed thereabove, the larger of said cups will automatically center above the smaller of said cups so that said opposed bearing members are aligned.

10. In a vehicle, the combination of a load-carrying trailer having a frame structure; a tractor adapted to power said trailer and having a frame structure; a fifth-wheel means for coupling said tractor with said trailer; a plurality of universal coupling units, each of said units comprising a pair of bearing members having opposed curved complementary bearing surfaces, a ball member disposed between said bearing surfaces and movable thereon, a pair of opposed hollow cups having cylindrical skirts surrounding said bearing members, one of said cups being smaller than the other whereby the skirt of said one cup fits over the skirt of the other of said cups, first bracket means coupling one of said bearing members with one of said frame structures, second bracket means coupling the other of said bearing members with said fifth-wheel means, and means for limiting relative movement between said bearing members; and a centering ring having a top surface, a bottom surface, and inner and outer faces extending between said top and bottom faces, said ring being provided with a recess disposed between said inner and outer faces and extending from said bottom surface toward said top surface, said recess snugly receiving the skirt of the smaller of said cups, the outer face of said ring being frustro-conical with the diameter of the bottom of said outer face being greater than the inside diameter of the skirt of the larger of said cups, and the diameter of the top of said outer surface being less than the diameter of the inside of the skirt of the larger of said cups, whereby the larger of said cups engages the outer surface of said ring and is centered thereabove.

References Cited in the file of this patent

UNITED STATES PATENTS

| | | |
|---|---|---|
| 1,695,373 | Harper | Dec. 18, 1928 |
| 2,038,265 | Bradley | Apr. 21, 1936 |
| 2,355,528 | Harper | Aug. 8, 1944 |
| 2,541,209 | Cox | Feb. 13, 1951 |
| 2,718,411 | Geerds | Sept. 20, 1955 |
| 2,794,656 | Seyferth | June 4, 1957 |
| 2,867,472 | Harper | Jan. 6, 1959 |

FOREIGN PATENTS

| | | |
|---|---|---|
| 972,500 | Germany | July 30, 1959 |